United States Patent
Weel

(10) Patent No.: US 8,214,873 B2
(45) Date of Patent: *Jul. 3, 2012

(54) METHOD, SYSTEM, AND COMPUTER-READABLE MEDIUM FOR EMPLOYING A FIRST DEVICE TO DIRECT A NETWORKED AUDIO DEVICE TO RENDER A PLAYLIST

(75) Inventor: Martin Weel, Modjeska, CA (US)

(73) Assignee: Dryden Enterprises, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,113

(22) Filed: Aug. 10, 2011

(65) Prior Publication Data

US 2012/0042007 A1     Feb. 16, 2012

Related U.S. Application Data

(63) Continuation of application No. 10/840,109, filed on May 5, 2004, now Pat. No. 8,028,323.

(51) Int. Cl.
*H04N 7/173* (2011.01)
(52) U.S. Cl. ......... 725/141; 725/133; 725/118; 709/219
(58) Field of Classification Search .................. 709/223, 709/203, 231, 206, 204, 219; 725/110, 88, 725/112, 86, 134, 141, 118, 133; 705/27; 348/734; 700/94
See application file for complete search history.

(56) References Cited

U.S. PATENT DOCUMENTS

| | | | |
|---|---|---|---|
| 5,819,160 A | 10/1998 | Foladare et al. | |
| 5,852,610 A | 12/1998 | Olaniyan | |
| 5,857,149 A | 1/1999 | Suzuki | |
| 5,907,831 A | 5/1999 | Lotvin et al. | |
| 5,949,492 A | 9/1999 | Mankovitz | |
| 6,014,569 A | 1/2000 | Bottum | |
| 6,088,455 A | 7/2000 | Logan et al. | |
| 6,182,128 B1 | 1/2001 | Kelkar et al. | |
| 6,199,076 B1 | 3/2001 | Logan et al. | |
| 6,226,672 B1 | 5/2001 | DeMartin et al. | |
| 6,229,621 B1 | 5/2001 | Kulakowski et al. | |
| 6,233,682 B1 | 5/2001 | Fritsch | |
| 6,253,069 B1 | 6/2001 | Mankovitz | |
| 6,349,329 B1 | 2/2002 | Mackintosh et al. | |
| 6,473,792 B1 | 10/2002 | Yavitz et al. | |
| 6,502,194 B1 | 12/2002 | Berman et al. | |
| 6,628,928 B1 | 9/2003 | Crosby et al. | |
| 6,662,231 B1 | 12/2003 | Drosset et al. | |
| 6,701,355 B1 | 3/2004 | Brandt et al. | |
| 6,711,622 B1 | 3/2004 | Fuller et al. | |
| 6,741,869 B1 | 5/2004 | Lehr | |
| 6,793,142 B2 | 9/2004 | Yap | |
| 6,823,225 B1 | 11/2004 | Sass | |
| 6,925,489 B1 | 8/2005 | Curtin | |

(Continued)

*Primary Examiner* — Le H Luu
(74) *Attorney, Agent, or Firm* — Withrow & Terranova, PLLC

(57) ABSTRACT

A method for playing music includes displaying a list of playlists names, selecting one of the displayed playlists names, sending at least one attribute of a playlist corresponding to the selected playlist name to a playlist server, receiving a playlist from the playlist server wherein the received playlist corresponds to the attribute(s), selecting at least one song from the received playlist, sending information representative of the selected song to a content server, receiving the selected song from the content server, and playing the selected song(s). Requesting a playlist on the first device based on attributes, sending the same attributes to a second device having the second device request the playlist and start playing.

46 Claims, 8 Drawing Sheets

U.S. PATENT DOCUMENTS

| | | |
|---|---|---|
| 7,010,263 B1 | 3/2006 | Patsiokas |
| 7,469,283 B2 | 12/2008 | Eyal et al. |
| 7,472,353 B1 | 12/2008 | Wolff et al. |
| 7,711,838 B1 | 5/2010 | Boulter et al. |
| 7,783,722 B1 | 8/2010 | Rosenberg et al. |
| 7,797,272 B2 | 9/2010 | Picker et al. |
| 7,840,691 B1 | 11/2010 | De Bonet et al. |
| 7,856,485 B2 | 12/2010 | Prager et al. |
| 7,870,088 B1 | 1/2011 | Chen et al. |
| 7,904,579 B2 | 3/2011 | Janik et al. |
| 7,917,645 B2 | 3/2011 | Ikezoye et al. |
| 7,926,085 B2 | 4/2011 | Del Beccaro et al. |
| 8,028,323 B2 | 9/2011 | Weel |
| 8,045,952 B2 | 10/2011 | Qureshey et al. |
| 8,050,652 B2 | 11/2011 | Qureshey et al. |
| 2002/0002039 A1 | 1/2002 | Qureshey et al. |
| 2002/0007418 A1* | 1/2002 | Hegde et al. ............... 709/231 |
| 2002/0072326 A1 | 6/2002 | Qureshey et al. |
| 2002/0194619 A1* | 12/2002 | Chang et al. ............... 725/134 |
| 2003/0217102 A1* | 11/2003 | Jystad et al. ............... 709/203 |
| 2003/0225834 A1* | 12/2003 | Lee et al. ............... 709/204 |
| 2004/0031058 A1* | 2/2004 | Reisman ............... 725/112 |
| 2004/0055014 A1* | 3/2004 | Edelson ............... 725/110 |
| 2004/0119894 A1* | 6/2004 | Higgins et al. ............... 348/734 |
| 2004/0133914 A1* | 7/2004 | Smith et al. ............... 725/86 |
| 2004/0205028 A1* | 10/2004 | Verosub et al. ............... 705/59 |
| 2004/0255340 A1 | 12/2004 | Logan |
| 2005/0044561 A1 | 2/2005 | McDonald |
| 2005/0071881 A1* | 3/2005 | Deshpande ............... 725/88 |
| 2005/0113946 A9* | 5/2005 | Janik ............... 700/94 |
| 2005/0240494 A1* | 10/2005 | Cue et al. ............... 705/27 |
| 2005/0251566 A1 | 11/2005 | Weel |
| 2005/0262204 A1* | 11/2005 | Szeto et al. ............... 709/206 |
| 2006/0218180 A1 | 9/2006 | Bodlaender et al. |
| 2006/0294212 A1* | 12/2006 | Kikkawa et al. ............... 709/223 |
| 2007/0088804 A1 | 4/2007 | Qureshey et al. |
| 2007/0089132 A1 | 4/2007 | Qureshey et al. |
| 2007/0089135 A1 | 4/2007 | Qureshey et al. |
| 2007/0180063 A1 | 8/2007 | Qureshey et al. |

* cited by examiner

METHOD, SYSTEM, AND COMPUTER-READABLE MEDIUM FOR EMPLOYING A FIRST DEVICE TO DIRECT A NETWORKED AUDIO DEVICE TO RENDER A PLAYLIST

CROSS-REFERENCE TO RELATED APPLICATION

The present application is a continuation of U.S. patent application Ser. No. 10/840,109, filed May 5, 2004, now U.S. Pat. No. 8,028,323, entitled "PLAYLIST DOWNLOADING FOR DIGITAL ENTERTAINMENT NETWORK," which is hereby incorporated herein by reference in its entirety.

FIELD OF THE INVENTION

The present invention relates generally to a method and system for playing music. The present invention relates more particularly to a digital entertainment network wherein playlists are obtained by communicating attributes of the playlists to a playlist server and wherein songs are obtained by communicating information representative of the songs to a content server.

BACKGROUND OF THE INVENTION

Traditionally, music has been provided to listeners by either a broadcast method or a purchase method. According to the broadcast method, music is broadcast to listeners by such means as radio and cable systems. The owners of the music are typically compensated by the broadcaster via either the American Society of Composers, Authors and Publishers (ASCAP) or Broadcast Music Incorporated (BMI). These two agencies monitor the playing of music by broadcasters, collect royalties from the broadcasters, and distribute the royalties to the copyright owners of the music.

However, according to the broadcast method the listener has little or no control over which selections are played. Generally, a listener must tune in to a radio station or select a cable channel that plays the type of music that the listener enjoys with the expectation that songs that the listener enjoys will occasionally be played. Too frequently, these songs are not played as often as the listener would prefer.

According to the purchase method, a listener purchases prerecorded music stored on media such as compact discs (CDs). The listener may then play the songs as many times as desired. Copyright owners are paid royalties out of the purchase price of the music.

However, the purchase method requires that a substantial price be paid for the music, at least in part because of the virtually unlimited use associated therewith. Listeners appear to be becoming less willing to pay the purchase price for such prerecorded music, particularly as alternative methods for obtaining music become more popular.

The purchase method suffers from the additional disadvantage of requiring that media containing the desired songs be utilized. Such media is somewhat bulky, particularly when a large number of selections are desired. In some instances, it may not be practical to carry all of the songs desired because of the volume and/or weight of the media required. Such media is also undesirably subject to degradation due to use and mishandling. For example, scratches on a CD may inhibit its use.

A newer method of providing music to listeners is becoming increasingly popular. It is this method of providing music that is apparently making listeners less willing to pay the purchase price for music that is prerecorded on media. According to this newer method of providing music, the music is downloaded from the Internet or otherwise obtained (such as by trading with friends), as a data file. One popular example of such a data file is an MP3 file. MP3 is short for Moving Picture Experts Group 1, audio layer 3.

Although music embodied in data files can be obtained legitimately, such as via such services like iTunes (a trademark of Apple Computer, Inc.), the opportunity to download or trade music data files for free has heretofore hampered this legitimate method of obtaining music.

As such, although the prior art has recognized, to a limited extent, the problem of distributing music, the proposed solutions have, to date, been ineffective in providing a satisfactory remedy. Therefore, it is desirable to provide a method for distributing music that is convenient, does not involve the use of media, and which provides for the payment of royalties.

BRIEF SUMMARY OF THE INVENTION

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The present invention specifically addresses and alleviates the above mentioned deficiencies associated with the prior art. More particularly, according to one aspect the present invention comprises a method for playing music, wherein the method comprises displaying a list of playlists names, selecting one of the displayed playlist names, sending at least one attribute of a playlist corresponding to the selected playlist name to a playlist server, receiving a playlist from the playlist server wherein the received playlist corresponds to the attribute(s), selecting at least one song from the received playlist, sending information representative of the selected song(s) to a content server, receiving the selected song(s) from the content server and playing the selected song(s).

According to one method of operation, the playlist names are displayed on a first device, a playlist name is selected on the first device, the attribute(s) are sent from the first device, the playlist is received by the first device, a song is selected from the first device, and the song is played on the first device.

According to another method of operation, the playlist names are displayed on a first device, a playlist name is selected on the first device, the attribute(s) are sent from the first device, the playlist is received by the first device, a song is selected from the first device, and the song is played on a second device.

The method of the present invention optionally comprises selecting the second device. In this instance, the playlist names are displayed on a first device, the playlist name is selected on the first device, the attribute(s) are sent from the first device, the playlist is received by the first device, the song is selected from the first device, and the song is played on the selected second device. Preferably, the second device is selected from the first device.

Preferably, the first device comprises a handheld portable device. For example, the first device may comprises a palmtop computer, an MP3 player, or a remote control for a second device.

Thus, the first device may comprise a remote control for a second device wherein the second device comprises a music rendering device. In this instance, songs are typically played upon the second device, although songs may also be played upon the first device.

Preferably, selecting one of the displayed playlist names and selecting a song from the playlist are performed using a touchscreen. If a second device is selected from the first device, the second device is also preferably selected using the touchscreen.

Preferably, communicating attributes of a playlist to a playlist server comprises communicating a name of a playlist to a playlist server. Communicating attributes of a playlist to a playlist server may comprise communicating to the playlist server at least one attribute such as a type of music listened to, at least one artist, at least one selection, at least one instrument, at least one record company, a region, a country, a state, a city, a school, and/or an ethnicity. The playlist server may then either locate or make a playlist that conforms to the attribute(s) of the requested playlist.

Sending at least one attribute of a playlist to a playlist server and receiving a playlist from the playlist server preferably comprises communicating the attribute(s) and the playlist via a network, preferably a wide area network such as the Internet.

Selecting at least one song from the playlist optionally comprises selecting a plurality of songs from the playlist and playing the selected song(s) then comprises playing the plurality of songs. The songs may be played in the order selected, in random order, or in any other desired order.

According to one aspect of the present invention, playlist recommendations based upon listening habits of a listener are automatically provided to the listener. Alternatively, the playlist recommendations may be based upon listening habits of another person. The playlist recommendations may comprise a list of currently popular songs within a single genre that is of interest to the listener.

Preferably, at least one parameter for a song that is being played on a second device can be adjusted from the first device. The parameters may include volume, tone, and/or balance.

According to one aspect, the present invention comprises a method for playing music, wherein the method comprises obtaining a playlist for a first device via the Internet, selecting a song from the playlist, and using the first device to cause a second device to play the selected song. The second device preferably obtains the song via the Internet.

According to one aspect, the present invention comprises a method for playing music, wherein the method comprises displaying a list of playlist names on a first device, selecting one of the displayed playlist names from the first device, sending at least one attribute of a playlist corresponding to the selected playlist name from the first device to a playlist server, receiving a playlist at the first device from the playlist server wherein the received playlist corresponds to the attribute(s), selecting at least one song from the playlist on the first device, sending information representative of the selected song from the first device to a content server, receiving the selected song at the first device from the content server, and playing the selected song(s) on the first device.

According to one aspect, the present invention comprises a method for playing music, wherein the method comprises displaying a list of playlist names on a first device, selecting one of the displayed playlist names from the first device, sending at least one attribute of a playlist corresponding to the selected playlist name from the first device to a playlist server, receiving at the first device a playlist from the playlist server wherein the received playlist corresponds to the attribute(s), selecting a second device, selecting at least one song from the playlist on the first device, sending information representative of the selected song from the first device to the second device, sending information representative of the selected song from the second device to a content server, receiving the selected song at the second device from the content server, and playing the selected song(s) on the second device.

According to one aspect, the present invention comprises a device for playing music, wherein the device comprises a display for displaying a list of playlist names and song names. The display is also for facilitating selection of playlists and songs. The device further comprises a network transceiver.

As used herein, the term network transceiver includes any circuit or device that facilitates communication via a network. Examples of network transceivers include Ethernet network interface cards (NICs) and circuits, as well as Bluetooth and WiFi cards and circuits.

The device is configured to facilitate displaying a list of playlist names on the display, selecting one of the displayed playlist names, sending at least one attribute of a playlist corresponding to the selected playlist name to a playlist server via the network transceiver, and receiving a playlist from the playlist server via the network transceiver. The received playlist corresponds to the attribute(s) sent to the playlist server. The device is further configured to facilitate selecting at least one song from the playlist, sending information representative of the selected song to a content server, receiving the selected song from the content server, and playing the selected song(s).

According to one aspect, the present invention comprises a device for playing music, wherein the device comprises a network transceiver. The device is configured to facilitate receiving information representative of a song from another device, sending of the information representative of the song to a content server via the network transceiver, receiving of the song from the content server, and playing of the song.

According to one aspect, the present invention comprises a playlist server comprising a memory within which a plurality of playlists are stored and a network transceiver. The playlist server is configured to facilitate receiving at least one attribute of a playlist via the network transceiver, identifying a playlist based upon the attribute(s), and sending of the playlist to a device via the transceiver.

Preferably, the playlist server is further configured to facilitate serving of content. Thus, the playlist server and the content server are effectively the same server. However, as those skilled in the art will appreciate, the playlist server and the content server may be two entirely different servers and may be located in diverse locations with respect to one another.

According to one aspect, the present invention comprises a method for providing music, wherein the method comprises receiving at least one attribute of a selected playlist at a playlist server and transmitting a playlist that corresponds to the attributes from the playlist server to a first device.

According to one aspect, the present invention comprises a system for playing music, wherein the system comprises a first device configured to display names of playlists and names of songs and to facilitate selection of the playlists and songs, a playlist server configured to receive at least one attribute of a playlist from the first device and to send a playlist corresponding to the received attribute(s) to the first device, and a content server configured to receive information representative of at least one song from the first device and to send corresponding songs to the first device. The present invention further comprises at least one second device configured to send attributes of a playlist to the playlist server, to send information representative of songs to the content server, to receive a playlist from the playlist server, and to receive songs from the content server.

According to one aspect, the present invention comprises a method for playing music, wherein the method comprises providing a first device that repeatedly wirelessly broadcasts a unique identification thereof and a password, and moving the first device into an area such that it can communicate wirelessly with at least one second device that repeatedly wirelessly broadcasts a unique identification thereof and a password. The first device displays names of the second device(s) for which the password is an authorized password for the first device, such that the first device can be used to select songs to be played on the second device(s). Each of the second devices displays the name of the first device when the password of the first device is an authorized password for the that second device, such that the second device can be used to select songs to be played on the first device.

According to one aspect, the present invention comprises a system for playing music, wherein the system comprises a playlist server in communication with the Internet wherein the playlist server has a plurality of playlists stored thereon, a content server in communication with the Internet wherein the content server has a plurality of songs stored thereon, a rendering device for playing songs, a set-top box in communication with the rendering device for facilitating communication of the songs from the content server to the rendering device via the Internet, and a remote control for controlling the set-top box.

The remote control is configured to obtain a playlist from the playlist server, facilitate, selection of a song from the playlist, and control the set-top box so as to cause the set-top box to download the song and cause the song to play on the rendering device.

The remote control is preferably dockable to the set-top box. The remote control may be either in wired or wireless communication with the set-top box when docked thereto. The remote control is preferably in wireless communication with the set-top box when the remote control is not docked thereto. The remote control can preferably be used to control the set-top box whether the remote control is docked thereto or not.

The remote control preferably comprises a display and a keypad for facilitating control of the set-top box and consequently for facilitating control of the rendering device. The set-top box optionally comprises a display and a keypad for facilitating control thereof and consequently for facilitating control of the rendering device.

According to one aspect, the present invention comprises a method for providing content, wherein the method comprises selecting content from a remote control and providing the selected content to a media player via a network.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
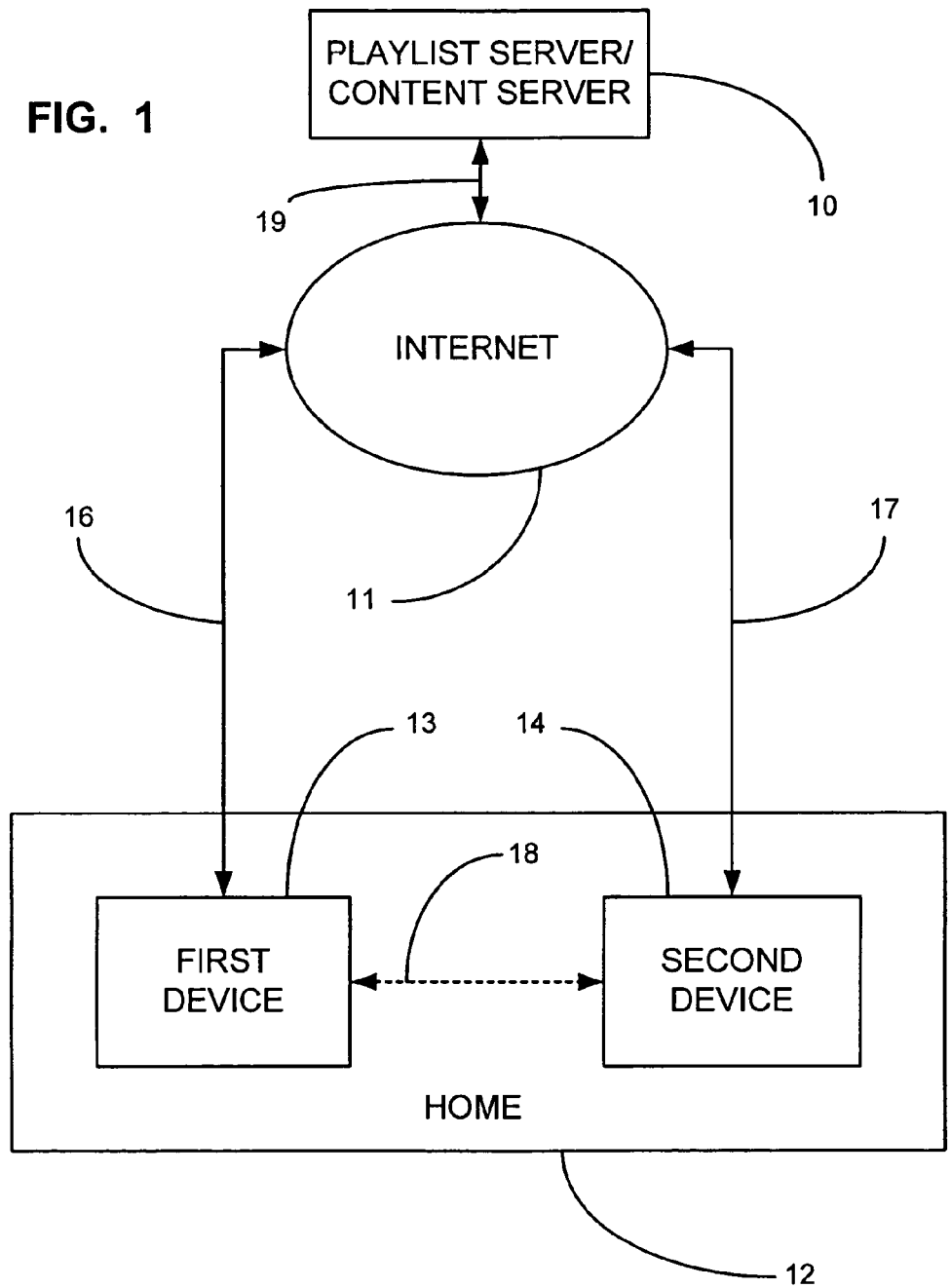
FIG. 1 is a block diagram showing an exemplary embodiment of the digital entertainment system of the present invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit of the invention.

The digital entertainment network of the present invention is preferably a fully integrated plug and play technology platform that delivers secure anytime, anywhere, on-demand multimedia content for digital home systems.

The digital entertainment network provides efficient and ubiquitous wireless and web-enabled control over digital home systems by enabling users to access and manage music content using a variety of control devices and by delivering such content to a wide variety of different rendering devices.

On-demand delivery of content, such as streaming music, is provided utilizing such user-friendly features such as customized playlists, collaboration, music management tools, and search capability.

The present invention preferably provides a plug and play control point that has the software intelligence that forms the basis for a truly integrated entertainment network system. This control point architecture delivers the ability to unify content, such as music or other types of multimedia content, with control applications that enable system users to access content from a variety of different remote control devices and deliver such content to a variety of rendering devices.

For example, the control point enables a digital entertainment network user to utilize a PDA or other device to browse for music on the Internet, then select and play a song on an MP3 player or the like, or even on stand-alone audio speakers. In another embodiment, the control point allows a user to choose a song via a set-top device, then play that music on a television, stereo system, or the like.

Preferably, the present invention comprises a web services based component that provides users with on-demand music streamed to a variety of devices, such as MP3 players, set-top boxes and home stereo systems. Thus, according to one aspect, the present invention is a web-based content and music management system that offers users a number of desirable features via a web browser.

These features preferably include web-based music catalog browsing via jukebox interface, search capability (to find artists and specific selections), the use of standard playlists, the use of custom playlists (created by each user), the ability to select different devices on which to play songs, the ability to view a user's activity over a given time period or in real-time with the activity streamer, collaboration, the ability to find buddies with the same music preferences you have in your playlists, the ability to share playlists with buddies, the ability to view buddies' activity based on various time periods, instant messaging for chatting among users, and the use of a set top box to facilitate the use of playlists and the streaming of content.

According to one aspect, the digital entertainment network of the present invention comprises a set-top box that provides users with on-demand music streamed to a variety of devices. The set-top box is a web-based content and music management system that offers users a list of features including the need for little or no setup (plug into Ethernet and video out, audio out), content catalog browsing, search capability (to find artists and specific selections), the use of standard playlists, the use of custom playlists (created by each user), the ability to select different devices on which to play songs, the ability to view your activity over a given time period or in real-time with the activity streamer, collaboration, the ability to find buddies with the same music preferences you have in your playlists, the ability to share playlists with buddies, the ability to view buddies' activity based on various time periods, and instant messaging for chatting among users.

The digital entertainment network of the present invention comprises control devices that allow users to communicate with the control point and give commands to render music/multimedia content on various different rendering devices. Examples of control devices include the personal digital assistant (PDAs) and set-top boxes.

According to one aspect of the present invention, a FDA based control application allows users to roam the house and play music content that is accessed via the PDA and is available via an Internet based service. According to one aspect, the content is played via set-top boxes, i.e., rendering devices, which may be located throughout the home.

The digital entertainment network also includes rendering devices that receive instructions from the control point and thereby render music/multimedia content. Rendering device examples include the set-top devices, home stereo systems and televisions. A variety of different types of rendering devices are possible. Audio content, such as music, may be rendered on audio rendering devices such as speakers, a stereo, and a television. Similarly, audio/video content, such as movies and television shows, may be rendered on televisions, stand alone monitors, and computer monitors. Indeed, either audio or audio/video content may be rendered on a variety of other types of devices, such as cellular telephones, PDAs, and laptop computers.

According to one aspect of the present invention, a set-top device is a key rendering device that plays music content on other rendering devices, such as televisions and stereo systems, throughout the home.

The digital entertainment network of the present invention optionally comprises a billing application for handling the financial transaction activities associated with streaming content payment and usage. The billing application preferably performs functions such as transaction and usage logging for billing processing, automated billing of customers, automated notification of the inability to charge a credit card on file (exception handling), and automated calculation and wire transfer of funds to content providers.

The present invention is illustrated in FIGS. 1-8, which depict presently preferred embodiments thereof.

Referring now to FIG. 1, a preferred embodiment of the present invention comprises a playlist server/content server 10 that is in communication with a network, preferably a wide area network such as the Internet 11. Also in communication with the network are a first device 13 and a second device 14, which are both typically located within a common structure, such as a home or office 12. The first device 13 generally assumes the function of the control point, although the second device 14 may have this functionality, as well.

The playlist server/content server 10 may be a single server. Alternatively, the playlist server and the content server may be two separate servers. Indeed, the playlist server may comprise a plurality of separate servers and/or the content server may similarly comprise a plurality of different servers.

The playlist server/content server is in bi-directional communication with the Internet 11, as indicated by arrow 19. The first device 13 is in bi-directional communication with the Internet 11, as indicated by arrow 16. The second device 14 is in bi-directional communication with the Internet 11, as indicated by arrow 17.

The first device is in communication with the second device, as indicated by arrow 18. The first device may be in either unidirectional or bi-directional communication with the second device 14.

The first device 13 may comprise any of a plurality of different types of devices. For example, the first device 13 may comprise a handheld portable device such as a personal digital assistant (PDA), a palmtop computer, an MP3 player, a telephone, or a remote control for a music rendering device. The first device may alternatively comprise a non-portable device, such as a desktop computer, a television, or a stereo.

The second device 14 may comprise the same type of device as the first device 14 or may alternatively comprise a different type of device with respect thereto. Thus, the first and second devices may comprise portable devices, non-portable devices, or any combination thereof.

The second device may also comprise one or more smart speakers. As defined herein, standalone smart speakers are speakers that are not connected to a device such as a stereo, television, or computer. Smart speakers are typically in communication with a network and can thus receive content therefrom. Typically, smart speakers comprise dedicated signal conditioning circuitry such as audio amplifiers.

According to one embodiment of the present invention, the first device 13 comprises a remote control for the second device 14. Thus, the second device may comprise a music rendering device such as a stereo, a television, or a home computer and the first device may comprise a handheld remote control therefor.

Any desired number of first and second devices may be provided according to the present invention. For example, the first device may comprise a remote control that controls a plurality of second devices, such as a television, a DVD player, and a stereo system.

Figure 2:
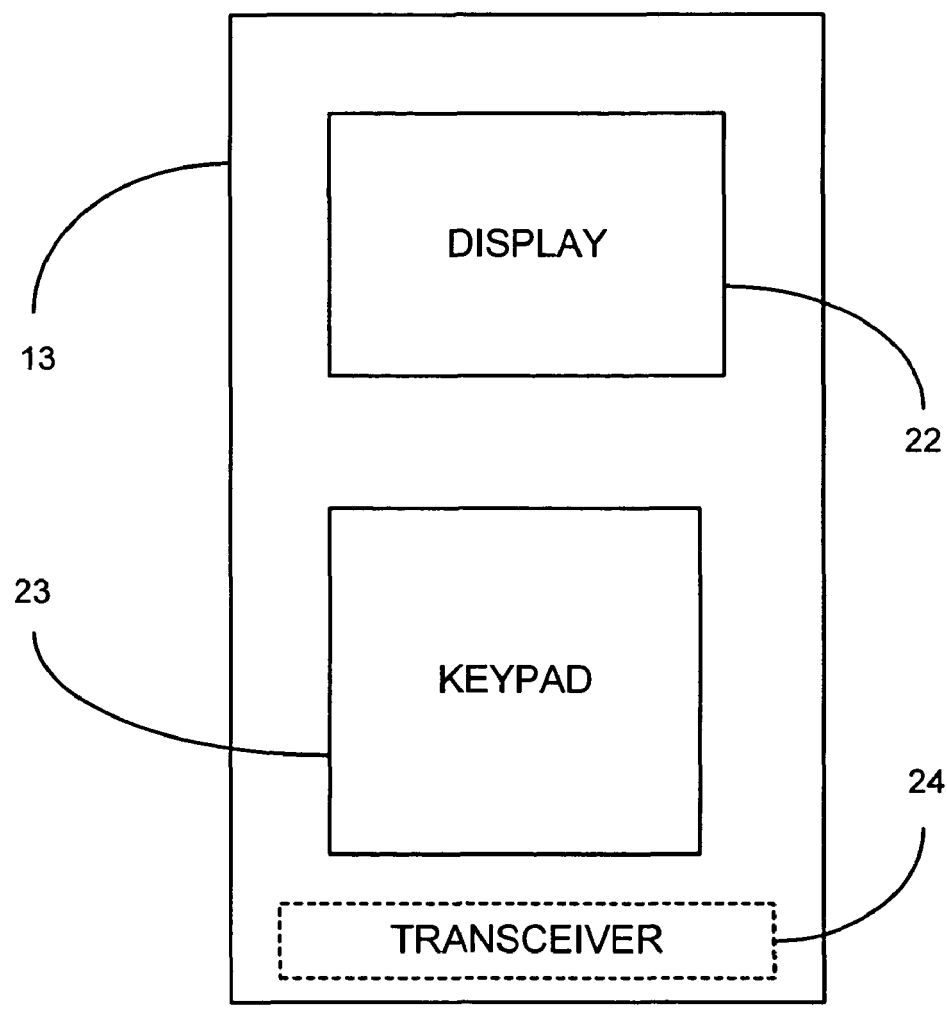
FIG. 2 is a block diagram showing further detail of an exemplary first device or remote control of FIG. 1.

Referring now to FIG. 2, the first device 13 may comprise a handheld portable device that comprises a display 22, a keypad 23, and a network transceiver 24. The display 22 facilitates viewing and selection of playlist names, as well as viewing and selection of songs within a playlist, as discussed in detail below. The keypad 23 facilitates selection of playlist names and selection of songs, as also discussed in detail below.

The display 22 may optionally comprise a touchscreen display and the keypad may optionally be omitted. In this instance, all selection may be performed via the touchscreen display.

The network transceiver 24 preferably comprises a wireless network transceiver, such network transceiver conforming to the Bluetooth (a trademark of Bluetooth SIG, Inc.) standard and/or conforming to the WiFi (a trademark of the WiFi Alliance) standard.

The device shown in FIG. 2 may also be the second device 14 according to one aspect of the present invention. However, for explanatory purposes it may sometimes be beneficial to think of the first device as a small handheld portable device such as a PDA or dedicated remote control that can function to control the second device and it may similarly sometimes be beneficial to think of the second device as a larger music rendering device such as a stereo, television, or personal computer. Of course, such embodiments of the present invention are by way of example only, and not by way of limitation.

Having described the general structures of the present invention, the general operation thereof will next be described with reference to FIGS. 3 and 4. In operation, the digital entertainment network of the present invention provides convenient access to a very large database of music without requiring that the music be stored and kept by the listener on media such as CDs This convenient access is provided by maintaining the database of music at a remote location, i.e., in an Internet based content server 10.

That is, the present invention generally does not attempt to store songs within the music rendering devices themselves, but rather generally downloads songs via a network, as needed. Such operation simplifies the construction and operation of the music rendering devices by eliminating the need for large storage capacities. The elimination of the need for large storage capacities results in a cost savings for manufacturing and purchasing the music rendering devices.

Downloading the music on an as-needed basis provides access to a very large database of songs that contains many more selections than can be stored on contemporary music rendering devices. Downloading the music on an as-needed basis also facilitates the payment of royalties to the music owners in a manner that is fair to both listeners and music owners.

One exception to downloading of music on an as-needed basis according to the present invention is optionally the use of caching. Songs that are played repeatedly may be cached, so as to mitigate the need for a network connection and thus mitigate the need for the bandwidth associated therewith. The playing of cached songs can be reported via the network and royalties paid as though the song had been downloaded strictly on an as-needed basis.

Preferably, the present invention comprises a first device that may operate in two different ways. According to a first way of operation, as shown in FIG. 3 and discussed in detail below, a listener selects a song to be played from a playlist on the first device and the song is then played on the first device. According to a second way of operation, as shown in FIG. 4 and discussed in detail below, a listener selects a song to be played from a playlist on the first device and the song is then played on another device, e.g., a second device.

Figure 3:
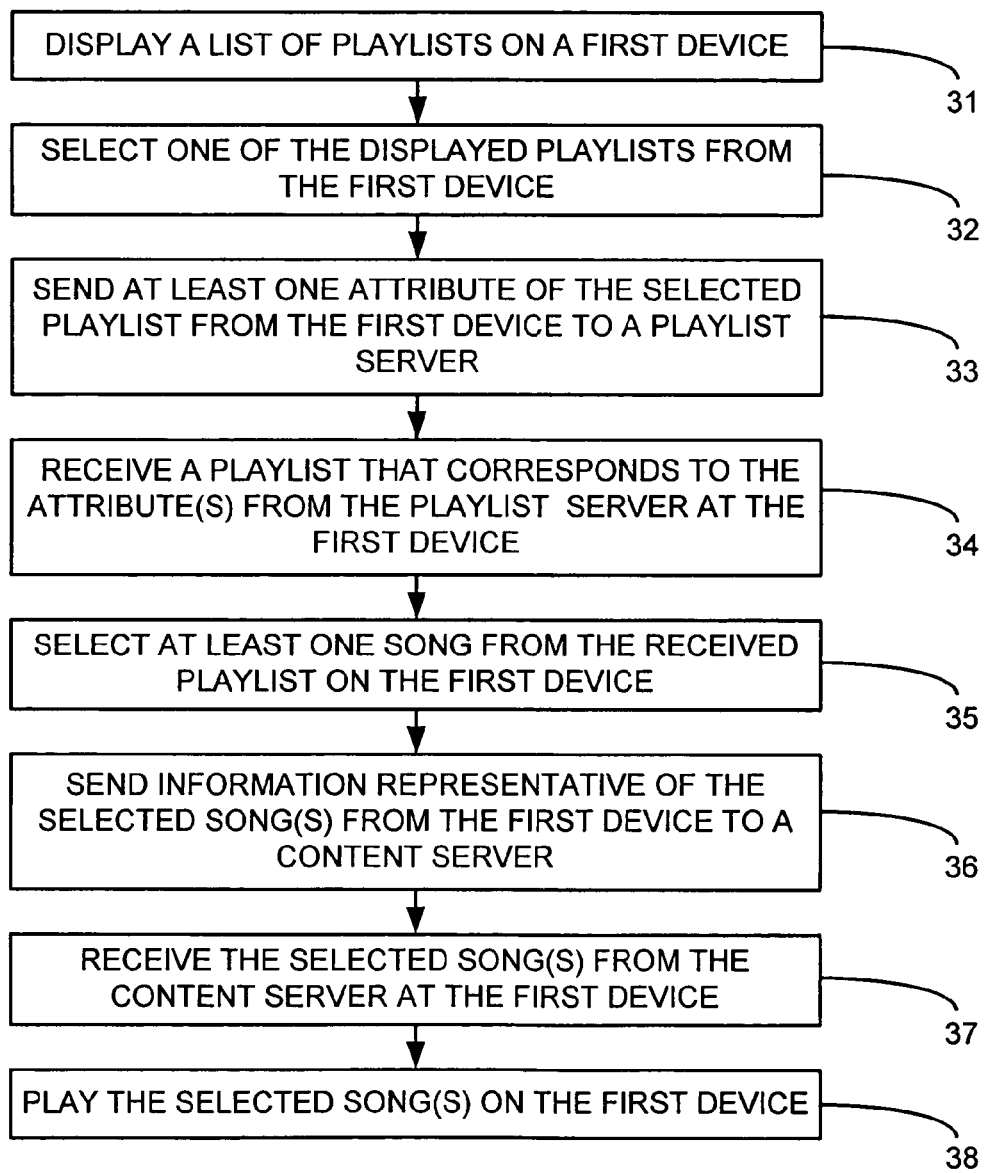
FIG. 3 is a flow chart showing one way of operating a digital entertainment system of the present invention.

Referring now to FIG. 3, the first way of operation of the first device is illustrated. A list of playlists is displayed on the first device as shown in block 31. The list of playlist is a list of playlist names, numbers, or other indicia indicative of individual playlists. For example, the list of playlists may include graphic symbols or icons in addition to or in place of other indicia. As used herein, the term playlist name includes any indicia that are uniquely representative of a playlist.

Each item on the list of playlists is representative of a particular playlist. Each playlist may come from any one of a variety of sources. For example, a playlist may be compiled by a user, a playlist may be obtained from someone else, or a playlist may be formed by a computer using an algorithm that attempts to identify songs that will suit the tastes of the listener.

The playlists are stored on a playlist server and are downloaded to the first device and the second device as requested by the listener. As mentioned above, the playlist server may be the same server as the content server.

Optionally, playlists as well as songs may be cached on the first device and/or the second device.

The list of playlists may be displayed upon the display 22 of the first device or may be displayed in any other desired manner. For example, the list of playlists may be displayed on the monitor of another device.

One of the displayed playlists is selected by the listener as shown in block 32. The selected playlist is a playlist that is expected to contain one or more songs that the listener would like to listen to. For example, the displayed list of playlists may contain a playlist named rock favorites, a playlist named country favorites, and a playlist named classical favorites. If the listener wants to listen to classical music that is on the playlist named classical favorites, the playlist named classical favorites is selected.

The desired playlist may be selected by using a touchscreen display of the first device 13, may be selected using the keypad 23, or may be selected by any other desired means.

At least one attribute of the selected playlist is sent from the first device to a playlist server as shown in block 33. The attribute(s) may comprise, for example, the name of a playlist, the number of a playlist, and/or any other unique identifier of a playlist.

Alternatively, the attribute(s) may comprise one or more parameters that are indicative of the type of music that the listener would like to hear. For example, the attribute(s) may comprise a code that indicates that a list of the top ten country hits for the week that is to be returned. The user may preferably compile sets of such parameters so as to facilitate the retrieval of custom, up to date playlists from the playlist server. Such parameters may be compiled directly on the first device or on any other device, such as a personal computer.

A playlist that corresponds to the attribute(s) is sent from the playlist server and is received by the first device as shown in block 34. This playlist is a list of songs containing at least one song that the listener would like to hear.

The listener selects at least one song from the received playlist, as shown in block 35. Either a single song may be selected, or a plurality of songs may be selected. The song(s) may be selected by using a touchscreen display of the first device 13, may be selected using the keypad, or may be selected by any other desired means.

Information representative of the selected song(s) is sent to a content server 10. The information may comprise the name(s) of the songs, the number(s) of the songs, or any other unique identifier thereof.

The selected song(s) are communicated from the content server 10 to the first device 13 via the Internet 11 as shown in block 37. The format of the selected songs may be MP3, WAV, or any other desired format.

The selected songs are played by the first device 13 as shown in block 38. The selected songs may be played in the order selected, in random order, or in any other desired order. The order can preferably be changed at any time.

The songs may be played via one or more speakers that are part of the first device 13, by one or more speakers that are in communication with the first device 13 (such as via a wired or wireless connection), by headphones, by earphones, or by any other desired means.

The volume, tone, and balance of the songs is preferably adjustable via the first device 13, such as via the display 22 and/or keypad 23 thereof.

Figure 4:
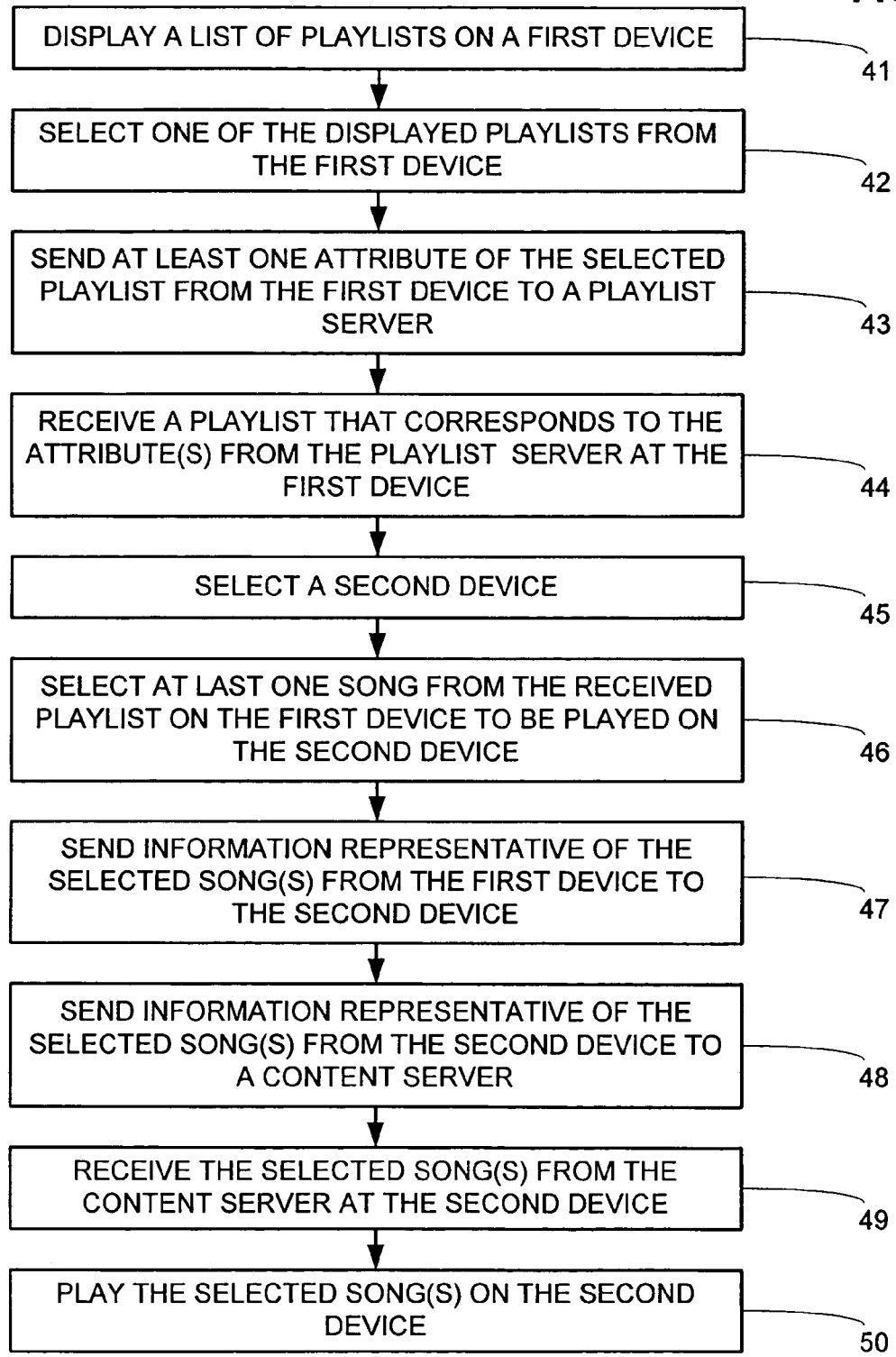
FIG. 4 is a flow chart showing another way of operating a digital entertainment system of the present invention.

Referring now to FIG. 4, the second way of operation of the first device is illustrated. According to this second way of operation, a list of playlists is displayed as shown in block 41, one of the playlists is selected as shown in block 42, at least one attribute is sent to the playlist server as shown in block 43, and a playlist is received as shown in block 44, all in the same fashion as in the first way of operation discussed above.

According to the second way of operation, the song is played on a device other than the first device 13. Thus, a second device 14 typically must be selected as shown in block 45. A particular second device may be selected from a list of second devices that is displayed on the first device 13. For example, a listener's desktop computer may be selected from a list having the desktop computer, a television, and a stereo listed thereon.

Preferably the list of second devices is dynamic and is automatically updated, such as via the use of a device discovery, process that is described in detail below. Alternatively, the list of second devices may be pre-configured by the listener and then manually updated, as desired.

At least one song is selected from the playlist as shown in block 46 and as discussed above.

Information representative of the selected song(s) is sent from the first device 13 to the second device 14. This information tells the second device 14 what song(s) are to be played. However, the second device does not typically have the selected songs stored therein. In some instances the selected songs may be cached within a memory of the second device 14, as discussed above.

The second device 14 sends information representative of the selected song(s) to a content server. Optionally, the second device also sends at least one attribute of the playlist from which the song(s) were selected on the first device 13 to the playlist server, as well.

The selected song(s) are received from the content server by the second device as shown in block 44 and are ready for playing. Optionally, the same playlist that is presently available for display on the first device is received from the playlist server, such that it is also available for display on the second device.

Generally, songs may be selected and played from the second device 14, as well as from the first device 13, such that it is beneficial to display the playlist on the second device 14. Even if songs cannot be selected and displayed from the second device 14, it may still be beneficial to view the playlist thereon.

The selected song is played on the second device 14 as shown in block 50 and discussed above. Parameters of the song such as volume, tone, and balance are optionally controllable from the first device 13.

Optionally, playlist and/or songs are cached in the first device 13 and/or the second device 14. Caching is particularly beneficial when the same songs and/or playlist are used repeatedly.

Although playlists and/or songs may be cached so as to mitigate the need for repeated downloading thereof from the playlist/content server 10, the memory requirements of the first device 13 and second device 14 are substantially reduced. This is true because the first device 13 and the second device 14 of the present invention do not store a substantial quantity of playlists or songs thereon.

That is, the first device 13 and the second device 14 of the present invention do not have to store all of the songs that a listener wishes to hear thereon. Rather, any such storage is generally incidental. Typically, a large number of the songs played by the first device 13 and the second device 14 are stored on the content server 10 and are communicated via the Internet 11 to the first device 13 and/or the second device 14 as needed.

Of course, such remote storage reduces the need for memory for the first device 13 and the second device 14, thereby desirably reducing the cost and size thereof and also enhancing the reliability thereof.

Figure 5:
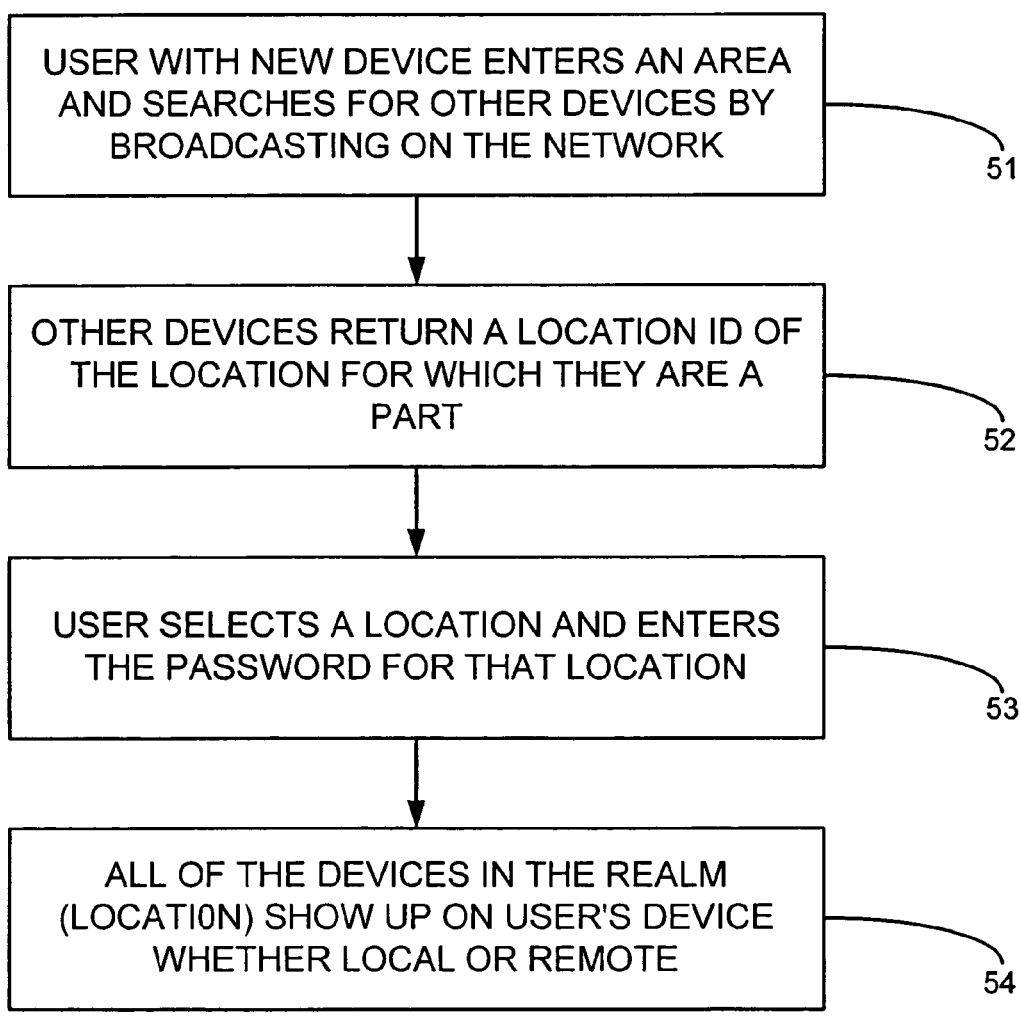
FIG. 5 is a flow chart showing operation of a discovery process wherein devices of the present invention recognize one another.

Referring now to FIG. 5, according to one aspect of the present invention all of the devices within an area, such as the area within which the devices can receive each other's wireless broadcast signals, are aware of one another and communicate with one another. When a new device enters the area, the existing devices become aware of the new device and the new device becomes aware of the existing devices via a discovery process.

According to this discovery process, all devices may periodically broadcast an identification code and a password. The identification code uniquely identifies the device. The password authorizes the device to communicate with other devices within the area.

When a new device enters the area, the new device and the existing devices communicate with, one another. This may be done either directly or via a server, as discussed in detail below. The new device recognizes any of the other devices that have an acceptable password and displays a list of the other devices on its list of available devices, so that the other devices may be selected as second devices for playing of songs, as discussed above.

Similarly, the devices already in the area recognize the new device if the new device has an acceptable password, and the devices already in the area display the new device in their list of available devices so that the new device may be selected as a second device for the playing of songs, if desired.

Alternatively, when a user enters a place with a new device, he can search for other devices by broadcasting on the network (whether wired or wireless), as shown in block 51. The other devices will return a location ID for the location or realm of which they are a part, as shown in block 52. The user can then select a desired one of the locations and enter the correct password for that location, as shown in block 53. Once this is done, then all of the devices in that realm will show up regardless of whether they are local or remote, as shown in block 54. The user is then free to do whatever the user wants to do with the other devices, if the security is set up to allow other users to control the other devices. For example, the user may play a song through another device or download a song therefrom.

Figure 8:
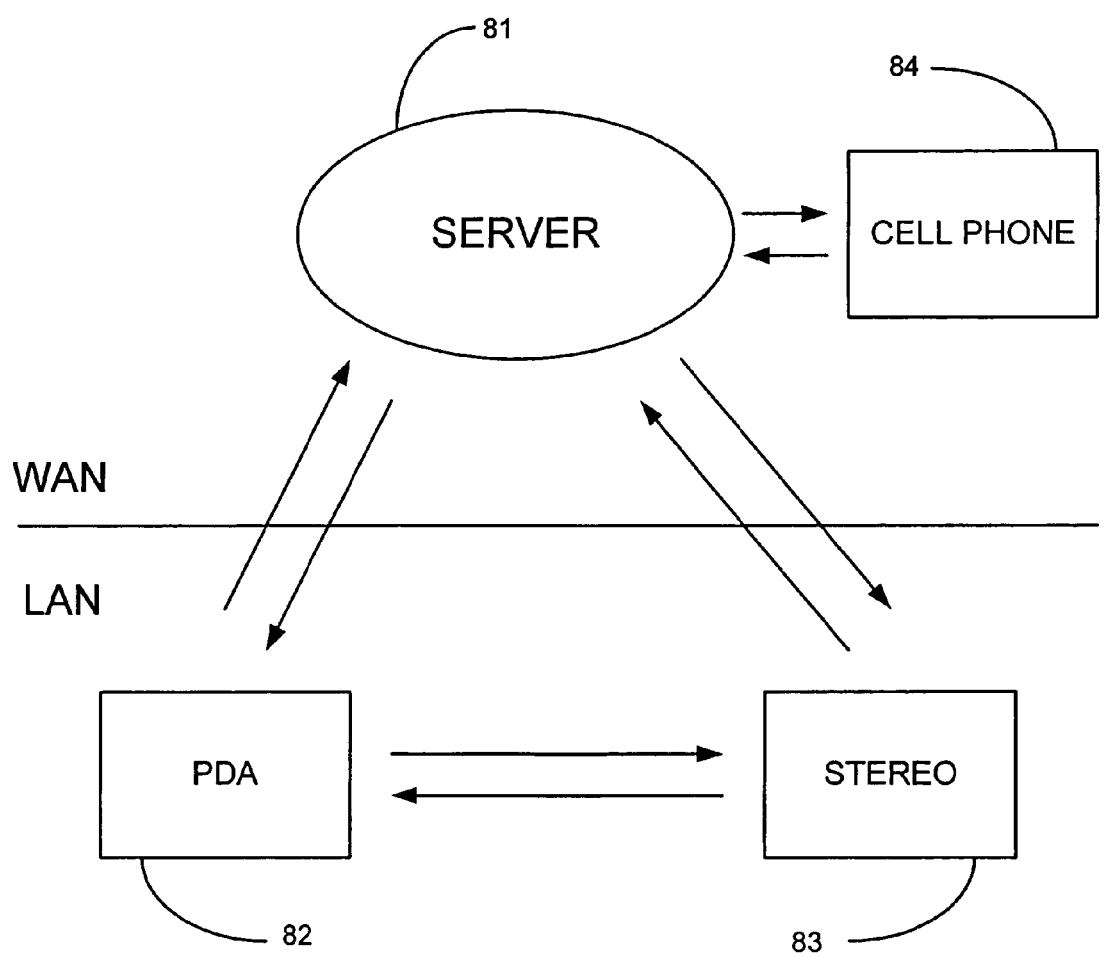
FIG. 8, is a block diagram showing the discovery process for both a local device and a remote device.

Referring now to FIG. 8, the discovery process is described in further detail. Preferably, a device can obtain a list of other devices in one of two different ways. According to a first way of obtaining lists of other devices, the lists are obtained through a server whether the device obtaining the lists is a local device or a remote device. According to a second way of obtaining lists of other devices, the lists are obtained directly from the other devices themselves, as long as the device obtaining the lists and the other devices are all local devices.

A local device is a device that is on the same local area network (LAN) as the other devices. That is, devices are considered to be local with respect to one another if they are all on the same local area network. A remote device is a device that is not on the same local area network as the other devices.

According to the first way of obtaining device lists, server 81, preferably on a wide area network such as the Internet, facilitates communication of a list of devices to a new device. The server may be the same server as the playlist server/content server 10 of FIGS. 1, 6, and 7 or may be a different server.

For example, if PDA 82 is a new device entering the area of a wireless local area network, a user may enter a user name or ID, a location identifier, and a password into the PDA 82. The user name or ID identifies the user to the rest of the local area network. An example of a user name or ID would be Joes PDA.

The location entry identifies the network that the user wants to become part of. For example, a network at Joe's house may be conveniently named Joes House.

The password is typically necessary to be part of the local area network. That is, the local area network will typically not allow a new device to log thereon without the correct password. The use of passwords may optionally be omitted, if desired.

Once the appropriate ID, location, and password have been entered, then the PDA 82 communicates with the server 81, such as via a wireless access point. The server 81 maintains a list of the devices on the local area network and communicates this list to the new device, i.e., the PDA 82.

The PDA 82 may then be used to select and control another device on the local area network, such as stereo 83. That is, the user may select the stereo 83 from the list of devices on the local are network and then may command the stereo to play a song or playlist of songs on the playlist of the PDA 82. The PDA 82 may also be used to control parameters of the song being played on the stereo 83, such as volume, tone, and balance. The PDA 82 may also be used to control the order in which the songs are played.

The PDA 82 may directly control the stereo 83, as indicated by the arrows therebetween. Alternatively, the PDA 82 may control the stereo through the server 81, particularly in those instance wherein communication directly between the PDA 82 and the stereo 83 are not adequately facilitated, such as when the distance therebetween is too great or when an obstruction (such as a wall or a larger piece of furniture) blocks the signal between the PCA 82 and the stereo 83.

When a new device can become part of the local area network, as described above, then the new device is a local device. However, in some instances a remote device may similarly be used to control a device on the network, such as the stereo 83, even though the remote device is not part of the local area network.

For example, the cell phone 84 is a remote device because it is not part of the local area network that the stereo 83 is on. However, the cell phone 84, may still communicate with the server 81, so as to obtain the list of devices on the local area network therefrom. It is still necessary for the cell phone user to enter an ID, location, and password into the cell phone, as was done with the PDA.

The remote device, i.e., cell phone 84, may similarly be used to control the stereo. However, the control signal will be communicated from the cell phone 84 to the server 81 through the server, since direct communication between the cell phone 84 and the stereo is typically not facilitated. Thus, the server 81 functions as a gateway for the remote device to communicate with devices on the local area network.

Preferably, the list of devices communicated from the server 81 to a new device, e.g., PDA, contains an indication as to whether devices on the list are local or remote with respect to the local area network. Thus, the new device knows whether commands to other devices must go through the server 81 or not.

According to the second way of obtaining a list of devices, instead of obtaining the list from the server 81, each device continuously broadcasts its presence, so as to facilitate auto-detection thereof. Thus, each device individually compiles its own list of other devices by monitoring the broadcasts therefrom. Preferably, a user must enter an ID, location, and password, as discussed above.

According to either method for obtaining a list of devices, a particular physical location, such as a coffee shop for example, may contain a plurality of logical locations or realms. Thus, a user may select a particular logical location to log onto. For example, one group of people at the coffee shop may be logged onto a location or local area network named Joes Coffee Group, while another group of people is logged onto a different location or local area network named Bills Coffee Group. A person newly entering the physical location, i.e., the coffee shop, may choose which group to join.

However, the new person must have the correct password for the logical location that he wishes to join. The password may be obtained by requesting it form someone in the logical location. Logging on to the logical location causes a list of devices (or users) to be communicated to the new user's device and also causes the new user's device to be added to the device lists of the other users, as discussed above.

According to one embodiment of the present invention, the first device comprises a remote control for a set-top box and the second device comprises a rendering device that receives signals from the set-top, such as a television or stereo. This embodiment of the present invention is illustrated in FIGS. 6 and 7 and is described in detail below.

Figure 6:
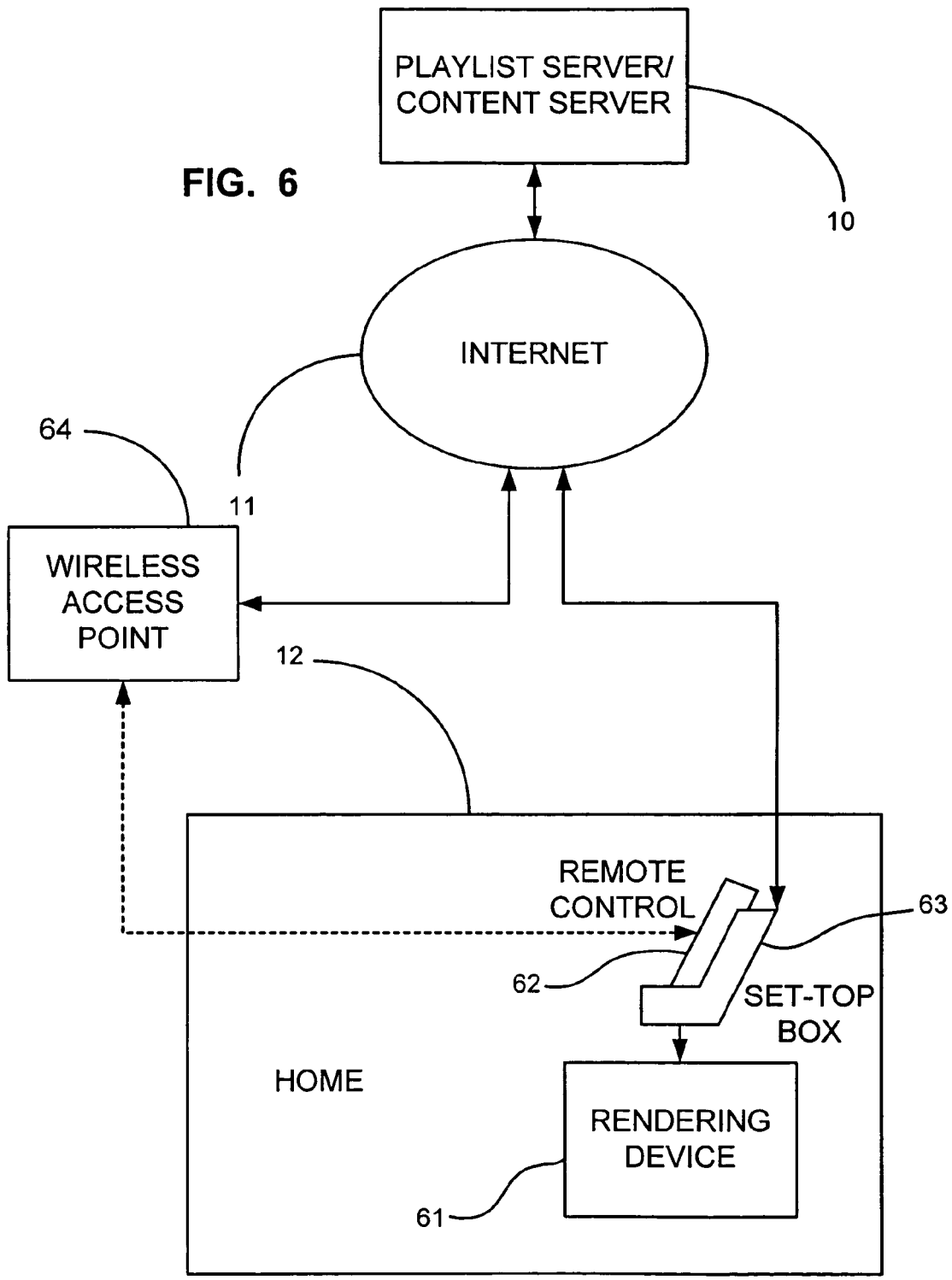
FIG. 6 is a block diagram showing an exemplary embodiment of the digital entertainment network of the present invention, wherein a set-top box has a removable remote control disposed within a cradle thereof.
Figure 7:
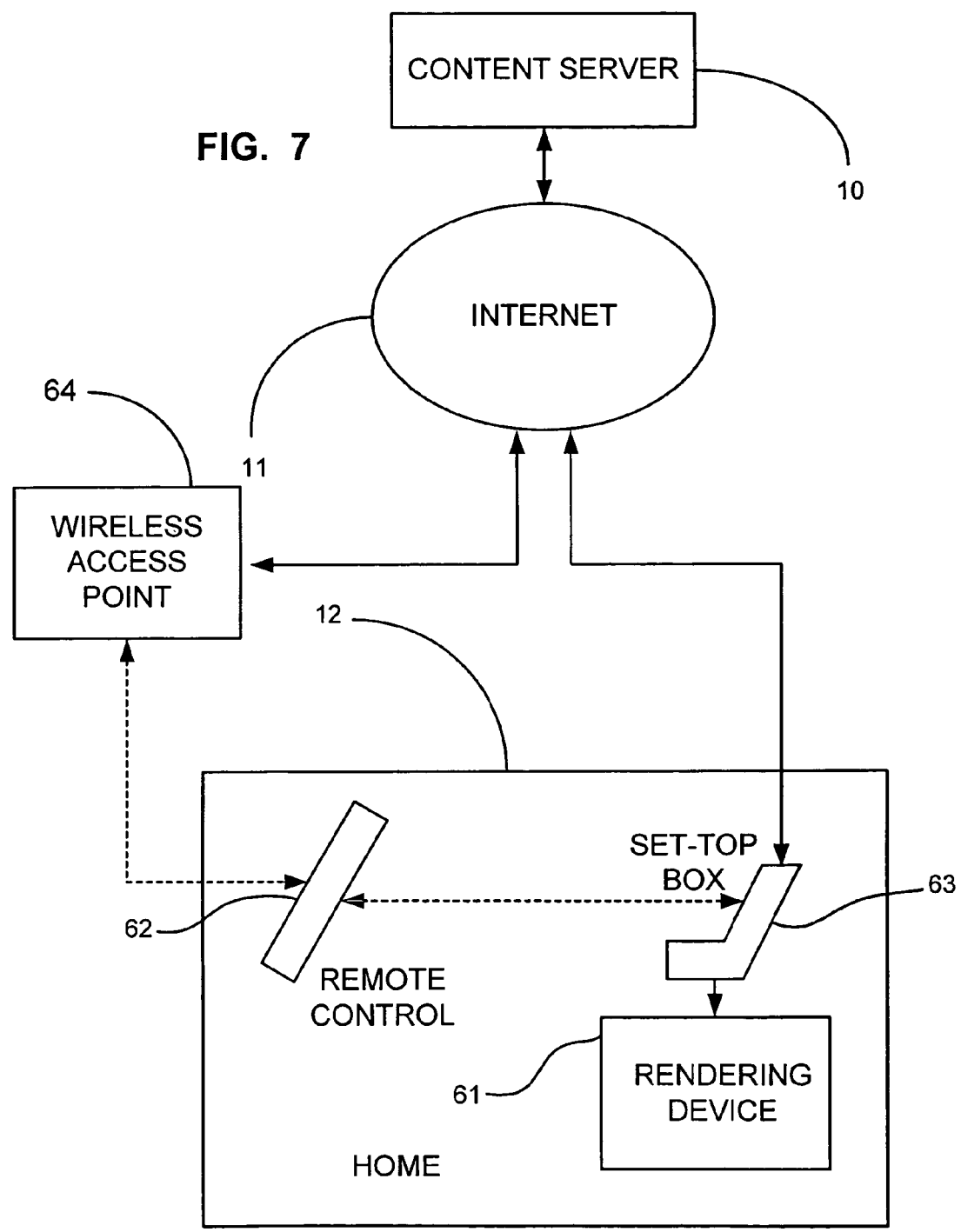
FIG. 7 is a block diagram showing the digital entertainment network of FIG. 6, wherein the set-top box has the removable remote control disposed out of the cradle thereof.

Referring now to FIG. 6, one embodiment of the present invention comprises a set-top box 63 that provides a signal to a rendering device, such as a television or stereo 61. The set-top box is in communication with the Internet 11. A playlist server/content server 10 is also in communication with the Internet, as described above.

Optionally, the set-top box functions as a cable television box in addition to functioning as a portion of the digital entertainment network of the present invention.

A remote control 62 for the set-top box 63 preferably fits into a cradle defined by at least a portion of the set-top box. The remote control 62 communicates wirelessly with the set-top box to control operation of the rendering device 61.

The remote control 62 is in wireless communication with the Internet 11, such as via a wireless access point or wireless router 64.

The remote control 62 defines a first device, as described in detail above. The set-top box, in combination with the rendering device 61, defines a second device as also described in detail above.

Thus, playlists can be requested by the remote control 62 and downloaded from the playlist server 10 via the Internet 11 thereto. Similarly, songs may be downloaded to the remote control 62. The songs may be played on the remote control 62 or may be played on the rendering device 61 in its role as a second device as described above.

For example, a song may be previewed on the remote control 62, even while another song is being played on the rendering device 61. A song may be listened to solely on the remote control 62 as the remote control is carried about at home. Such listening may be via one or more speakers built into the remote control 62 or may be via earphones.

Optionally, the set-top box comprises a display, so that playlists and songs can be selected therefrom. Playlists and songs are downloaded to the set-top box in its role as a second device, as discussed above.

The remote control 62 may be used while cradled by the set-top box 63, as shown in FIG. 6. Alternatively, the remote control 62 may be used while removed from the set-top box 63, as shown in FIG. 7.

Chat is preferably provided by the first 13 and/or second 14 devices of the present invention. Chat may be used for collaboration among listeners, such as for the compilation and/or exchange of playlists. Such chat may be implemented as voice chat or as text chat in a fashion similar to Internet Relay Chat (IRC), Microsoft Instant Messenger (IM), or AOL Instant Messenger (IM).

According to one aspect of the present invention, playlist recommendations may be provided to a listener. These playlist recommendations may be provided by the playlist server and may be based upon the listening habits of the listener or upon previous playlist requests. The listening habits of the listener may be determined from playlist and/or song downloads from the playlist server and/or the content server. That is, a playlist recommendation of a playlist of the top ten contemporary songs may be made by the playlist server to a listener who continually listens to several of the songs on this playlist. Similarly, a playlist recommendation of a playlist of the top ten country songs may be made to a listener who has requested playlists containing country songs.

The playlist server may also provide playlist recommendations based upon the playlists of others. That is, the playlist server may be configured to recognize when two or more people appear to have similar listening habits and may then recommend the playlists of one of these people to others of the same group.

The wireless communications discussed herein may be effected via a network, such as a network conforming to the Bluetooth (a trademark of Bluetooth SIG, Inc.) standard and/or conforming to the WiFi (a trademark of the WiFi Alliance) standard.

Communications between the first and second devices may be either via a network or via dedicated non-network communications devices such as those utilizing any desired form of wireless data transfer, including those using infrared (IR) and radio frequency (RF).

Although the content described herein is music, those skilled in the art will appreciate that other types of content, including both audio and non-audio content, are likewise subject to use by the present invention. For example, the content may comprise talks, speeches, comedy sketches, stories or books that are read aloud, pictures, video, software, or data.

It is understood that the exemplary digital entertainment network described herein and shown in the drawings represents only presently preferred embodiments of the invention. Indeed, various modifications and additions may be made to such embodiments without departing from the spirit and scope of the invention. Thus, various modifications and additions may be obvious to those skilled in the art and may be implemented to adapt the present invention for use in a variety of different applications.

What is claimed is:

1. A method for facilitating the presentation of media, the method comprising:
    displaying, on a first device, at least one device identifier identifying a second device;
    receiving user first input selecting the at least one device identifier;
    receiving, on the first device, a playlist, the received playlist comprising a plurality of media item identifiers;
    receiving user second input selecting at least one media item identifier from the received playlist; and
    directing, from the first device, the second device to receive a media item identified by the at least one media item identifier from a content server, without user input via the second device.

2. The method as recited in claim 1, wherein the first device comprises a handheld portable device.

3. The method as recited in claim 1, wherein the first device comprises a palmtop computer.

4. The method as recited in claim 1, wherein the first device comprises an MP3 player.

5. The method as recited in claim 1, wherein the first device comprises a mobile phone.

6. The method as recited in claim 1, wherein the first device comprises a remote control operative to control the second device.

7. The method as recited in claim 1, wherein the first device comprises a remote control operative to control the second device and the second device comprises a media rendering device.

8. The method as recited in claim 7, wherein the first device is operative to adjust a volume parameter on the second device.

9. The method as recited in claim 7, wherein the first device is operative to adjust a tone parameter on the second device.

10. The method as recited in claim 7, wherein the first device is operative to adjust a balance parameter on the second device.

11. The method as recited in claim 1, further comprising displaying a plurality of device identifiers on the first device, wherein each of the plurality of device identifiers identifies a corresponding device, and wherein receiving the user first input selecting the at least one device identifier further comprises receiving the user first input selecting the at least one device identifier from the plurality of device identifiers.

12. The method as recited in claim 1, wherein the user second input selects the plurality of media item identifiers from the received playlist in a first order; and
wherein directing the second device to receive the media item identified by the at least one media item identifier from the content server further comprises directing the second device to receive a plurality of media items identified by the plurality of media item identifiers from the content server in the first order.

13. The method as recited in claim 1, wherein the user second input selects the plurality of media item identifiers from the received playlist in a first order; and
wherein directing the second device to receive the media item identified by the at least one media item identifier from the content server further comprises directing the second device to receive a plurality of media items identified by the plurality of media item identifiers from the content server in an order other than the first order.

14. The method as recited in claim 1, further comprising automatically providing a recommendation of a playlist name based upon listening habits of a listener.

15. The method as recited in claim 1, wherein directing the second device to receive the media item identified by the at least one media item identifier from the content server further comprises directing the second device to download the media item identified by the at least one media item identifier from the content server.

16. The method as recited in claim 1, wherein directing the second device to receive the media item identified by the at least one media item identifier from the content server further comprises directing the second device to stream the media item identified by the at least one media item identifier from the content server.

17. A method for obtaining a song, the method comprising:
obtaining a playlist on a first device over a network, the playlist comprising a plurality of song identifiers;
displaying on the first device at least one device identifier identifying a second device;
selecting, responsive to user first input at the first device, the at least one device identifier;
selecting, responsive to user second input at the first device, a song identifier from the playlist; and
directing, from the first device, the second device to obtain a song identified by the song identifier without user input via the second device.

18. The method of claim 17, further comprising:
requesting, by the second device, the song identified by the song identifier from a content server; and
downloading the song from the content server to the second device.

19. The method of claim 17, further comprising:
requesting, by the second device, the song identified by the song identifier from a content server; and
streaming the song from the content server to the second device.

20. The method of claim 17, wherein the network comprises the Internet.

21. The method of claim 17, wherein the network comprises a local area network.

22. The method of claim 17, further comprising affecting a volume of the song on the second device from the first device.

23. A device for selecting a media item, the device comprising:
a display for displaying at least one device identifier; and
a network transceiver for facilitating communication between the device and at least one second device on a network, wherein the device is configured to facilitate:
displaying on the display the at least one device identifier identifying the at least one second device;
receiving user first input selecting the at least one device identifier;
receiving a playlist via the network transceiver;
receiving user second input selecting at least one media item name from the playlist; and
directing the at least one second device to send information representative of the at least one media item name to a content server without user input via the second device, and to receive a media item corresponding to the at least one media item name from the content server.

24. The device of claim 23, wherein the device comprises a remote control device that is not capable of playing the media item corresponding to the at least one media item name.

25. A method for obtaining media, the method comprising:
displaying, on a first device, at least one device identifier identifying a second device;
selecting, responsive to user first input at the first device, the at least one device identifier;
displaying, on the first device, a plurality of playlist names;
selecting, responsive to user second input at the first device, one of the plurality of playlist names;
sending at least one attribute of a playlist corresponding to the selected playlist name to a playlist server;
receiving, on the first device, the playlist from the playlist server, the received playlist corresponding to the at least one attribute and comprising a plurality of media item identifiers;
selecting, responsive to user third input at the first device, at least one media item identifier from the received playlist; and
directing the second device, without user input via the second device, to receive a media item identified by the at least one media item identifier from a content server and to play the media item.

26. A method for obtaining media, the method comprising:
displaying, on a first device, a plurality of device identifiers;
receiving user first input selecting one of the plurality of device identifiers, wherein the one of the plurality of device identifiers identifies a second device;
sending at least one attribute of a playlist corresponding to a selected playlist name to a playlist server;
receiving, on the first device, the playlist from the playlist server, the received playlist corresponding to the at least one attribute and comprising a plurality of media item identifiers;
selecting at least one media item identifier from the received playlist; and
directing, from the first device, the second device to receive a media item identified by the at least one media item identifier from a content server without user input via the second device and to play the media item.

27. A method of directing a second device from a first device, the method comprising:
   displaying, on the first device, a plurality of device identifiers;
   receiving user first input identifying one of the plurality of device identifiers, wherein the one of the plurality of device identifiers identifies the second device;
   sending, from the first device, at least one attribute of a playlist corresponding to a selected playlist name to a playlist server;
   receiving a playlist from the playlist server, the received playlist corresponding to the at least one attribute and comprising a plurality of media item identifiers;
   receiving, at the first device, user second input identifying at least one media item identifier from the received playlist; and
   directing, from the first device and without user input via the second device, the second device to obtain a media item identified by the at least one media item identifier from a content server and to play the media item.

28. The method as recited in claim 27, wherein directing the second device to obtain the media item identified by the at least one media item identifier from the content server and to play the media item further comprises directing the second device to download the media item identified by the at least one media item identifier from the content server and to play the media item.

29. The method as recited in claim 27, wherein directing the second device to obtain the media item identified by the at least one media item identifier from the content server and to play the media item further comprises directing the second device to stream the media item identified by the at least one media item identifier from the content server and to play the media item.

30. A device for selecting a media item, the device comprising:
   a display for displaying at least one device identifier; and
   a network transceiver for facilitating communication between the device and at least one second device via a network, wherein the device is configured to facilitate:
   displaying on the device the at least one device identifier identifying the at least one second device;
   receiving user first input selecting the at least one device identifier;
   receiving a playlist, the playlist comprising a plurality of media item identifiers;
   receiving user second input selecting at least one media item identifier from the playlist; and
   directing, from the device, the at least one second device to receive the media item identified by the at least one media item identifier from a content server, without user input via the second device.

31. The device as recited in claim 30, wherein the device comprises a handheld portable device.

32. The device as recited in claim 30, wherein the device comprises a palmtop computer.

33. The device as recited in claim 30, wherein the device comprises an MP3 player.

34. The device as recited in claim 30, wherein the device comprises a mobile phone.

35. The device as recited in claim 30, wherein the device comprises a remote control operative to control the at least one second device.

36. The device as recited in claim 30, wherein the device comprises a remote control operative to control the at least one second device, and the at least one second device comprises a media rendering device.

37. The device as recited in claim 36, wherein the device is operative to adjust a volume parameter on the second device.

38. The device as recited in claim 36, wherein the device is operative to adjust a tone parameter.

39. The device as recited in claim 36, wherein the device is operative to adjust a balance parameter.

40. The device as recited in claim 30, further comprising displaying a plurality of device identifiers on the first device, wherein each of the plurality of device identifiers identifies a corresponding device, and wherein receiving the user first input selecting the at least one device identifier further comprises receiving the user first input selecting the at least one device identifier from the plurality of device identifiers.

41. The device as recited in claim 30, wherein the user second input selects the plurality of media item identifiers from the playlist in a first order, and wherein directing the second device to receive the media item identified by the at least one media item identifier from the content server further comprises directing the second device to receive a plurality of media items identified by the plurality of media item identifiers from the content server in the first order.

42. The device as recited in claim 30, wherein the user second input selects the plurality of media item identifiers from the playlist in a first order, and wherein directing the second device to receive the media item identified by the at least one media item identifier from the content server further comprises directing the second device to receive a plurality of media items identified by the plurality of media item identifiers from the content server in an order other than the first order.

43. The device as recited in claim 30, further comprising automatically providing a recommendation of a playlist name based upon listening habits of a listener.

44. The device as recited in claim 30, wherein directing the at least one second device to receive the media item identified by the at least one media item identifier from the content server, without user input via the second device, comprises directing the at least one second device to download the media item identified by the at least one media item identifier from the content server, without user input via the second device.

45. The device as recited in claim 30, wherein directing the at least one second device to receive the media item identified by the at least one media item identifier from the content server, without user input via the second device, comprises directing the at least one second device to stream the media item identified by the at least one media item identifier from the content server, without user input via the second device.

46. A computer program product for facilitating the presentation of media, the computer program product stored on a non-transitory computer-readable storage medium and including instructions configured to cause a processor to carry out the steps of:
   displaying, on a first device, at least one device identifier identifying a second device;
   receiving user first input selecting the at least one device identifier;
   receiving, on the first device, a playlist, the received playlist comprising a plurality of media item identifiers;
   receiving user second input selecting at least one media item identifier from the received playlist; and
   directing, from the first device, the second device to receive a media item identified by the at least one media item identifier from a content server, without user input via the second device.

* * * * *